(12) United States Patent
Nedachi

(10) Patent No.: US 6,570,463 B1
(45) Date of Patent: May 27, 2003

(54) SIGNAL TRANSMISSION SYSTEM

(75) Inventor: Takaaki Nedachi, Tokyo (JP)

(73) Assignee: NEC Corporation, Tokyo (JP)

( * ) Notice: Subject to any disclaimer, the term of this patent is extended or adjusted under 35 U.S.C. 154(b) by 2 days.

(21) Appl. No.: 09/699,555

(22) Filed: Oct. 31, 2000

(30) Foreign Application Priority Data

Nov. 2, 1999  (JP) .......................................... 11-312392

(51) Int. Cl.[7] ................................................ H04B 3/04
(52) U.S. Cl. ........................ 333/20; 333/24 R; 333/33; 326/30; 327/100; 327/333
(58) Field of Search ............... 333/33, 24 R, 333/20; 326/30; 327/101, 102, 103, 126, 330, 333, 100

(56) References Cited

U.S. PATENT DOCUMENTS 3,751,591 A  *  8/1973  Radcliffe et al. ............. 178/68

3,990,024 A  *  11/1976  Hou ............................. 333/33

* cited by examiner

Primary Examiner—Barbara Summons
(74) Attorney, Agent, or Firm—Sughrue Mion, PLLC

(57) ABSTRACT

A signal transmission system of the present invention has an output impedance Zs of a driving circuit, a characteristic impedance ZsO of the first transmission line, and a characteristic impedance ZO of a second transmission line are adjusted to satisfy a mathematical relation of: Zs<ZsO<ZO to provide a waveform of input of a receiving circuit with an overshoot characteristic. In the signal transmission system of the present invention, furthermore, ma time obtained by doubling a transmission time of the first transmission line with Ls in line length is shorter than a rise time Tr and a fall time Tf of the signal at an output end of the second transmission line.

14 Claims, 8 Drawing Sheets

DIRECTION OF PROPAGATING SIGNAL →

SIGNAL TRANSMISSION SYSTEM

BACKGROUND OF THE INVENTION

The present invention relates to a signal transmission system for transmitting signals from a driving circuit to a receiving circuit through a transmission line.

As long-distance data transmissions between information processing units or the like become faster in recent years, a waveform distortion caused by the attenuation of a transmitted signal through a transmission line such as a cable or a printed wiring board becomes one of the problems to be addressed. Several attempts have been made to reduce a waveform distortion caused by the attenuation. Such attempts include: the shortening of a distance required for data transmission; the improvement in a transmission line; the improvement in the performance of circuit such as the addition of an equalizer or the addition of an emphasizer; or the development of a high-accuracy receiver circuit. However, these attempts take much time and costs to provide additional components and develop individual circuits and transmission lines.

In the conventional signal transmission system described above, therefore, there are several problems that need to be addressed. For example, much time and costs are required to improve a transmission line to make an addition of specific circuit or the like for reducing the waveform distortion caused by attenuation of transmitted signal through the transmission line.

SUMMARY OF THE INVENTION

An object of the present invention is to provide a signal transmission system which reduces a waveform distortion caused by the attenuation of a transmitted signal through a transmission line without having to use additional specific circuit or the like and also without having any improvement of its transmission line.

According to one aspect of the present invention, a signal transmission system is provided which includes: a driving circuit with a characteristic impedance of Zs; a receiving circuit for receiving the signal from the driving circuit; and a transmission line for transmitting a signal from the driving circuit to the receiving circuit, wherein the transmission line includes a first transmission line with a characteristic impedance of ZsO connected to the driving circuit and a second transmission line with a characteristic impedance of ZO connected to the receiving circuit, wherein the relationship between the characteristic impedance ZsO and the characteristic impedance ZO is adjusted to satisfy a mathematical relation of: Zs<ZsO<ZO, and wherein a time obtained by doubling a transmission time of the first transmission line is shorter than a rise time and a fall time of the signal at an output end of the second transmission line.

According to one aspect of the present invention, a signal transmission system is provided which includes: a driving circuit with a characteristic impedance of Zs; a receiving circuit for receiving the signal from the driving circuit; and a transmission line for transmitting a signal from the driving circuit to the receiving circuit, wherein the transmission line includes a first transmission line with a characteristic impedance of ZsO connected to the driving circuit and a second transmission line with a characteristic impedance of ZO connected to the receiving circuit, wherein the characteristic impedance Zs, the characteristic impedance ZsO and the characteristic impedance ZO is defined to make the signal input to the receiving circuit overshoot, and wherein a time obtained by doubling a transmission time of the first transmission line is shorter than a rise time and a fall time of the signal at an output end of the second transmission line.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
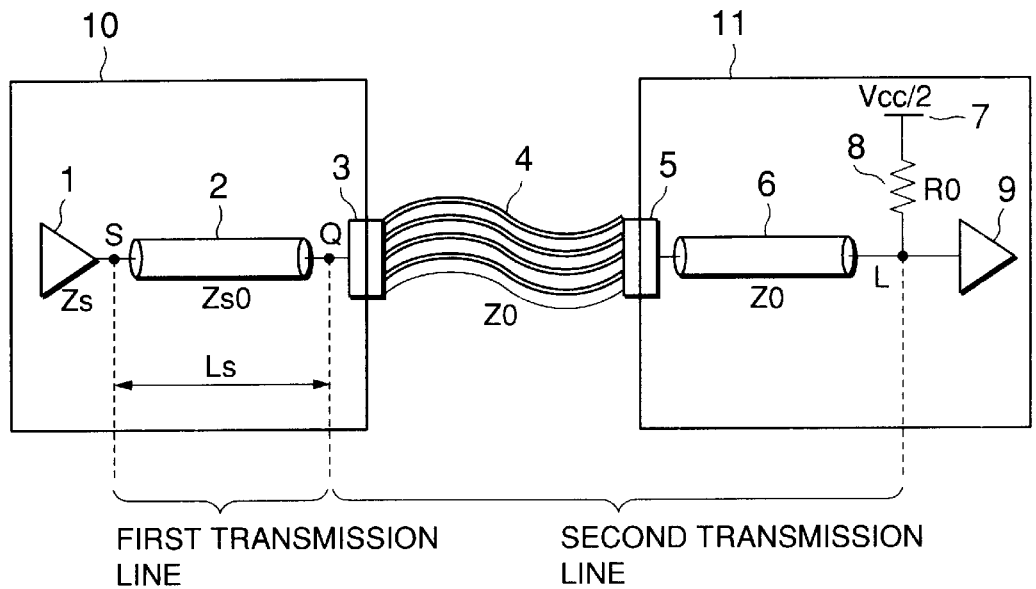
FIG. 1 is a schematic diagram that illustrates a configuration of a signal transmission system as a first embodiment of the present invention.

Referring to FIG. 1, a signal transmission system of the present embodiment includes two packages 10 and 11, which include, for example, printed circuit boards, respectively, and a transmission line 4 constructed by a cable having plug connectors or the like for connecting packages 10 and 11, together. Thus, the signal transmission system of the present embodiment is, but not limited to, in the type of offering a 1:1 connection ratio between two packages 10, 11 with a characteristic impedance of "ZO" and transmits a signal from the package 10 to the package 11 through the transmission line 4.

The package 10 includes a driving circuit 1 with an output impedance of Zs, wiring on a printed board of the package 10, a transmission line 2 with a characteristic impedance of ZsO constructed of, for example, a coaxial line, and a receiver's side receptacle connector 3. The package 11, on the other hand, includes a receiver's side receptacle connector 5, a transmission line 6 with a characteristic impedance of ZO constructed of, for example, a printed board, a terminating voltage supply 7 (Vcc: source voltage for driving and receiving circuits), a terminating resistor 8 (resistance value RO=ZO, with impedance matching), and a receiving circuit 9.

The transmission line between the driving circuit 1 and the receiving circuit 9 may be divided into first and second transmission paths with respect to the values of characteristic impedance. The first transmission path has the transmission line 2. The second transmission path has the driver's side receptacle connector 3, the transmission line 4, the receiver's side receptacle connector 5, and the transmission line 6.

The characteristic impedance ZsO of the transmission line 2 provided as the first transmission path, the characteristic impedance of the second transmission line ZO and the output impedance Zs of the driving circuit 1 are set so as to satisfy the following mathematical expression (1).

$$Zs < ZsO < ZO \tag{1}$$

In addition, the line length (distance) Ls between the point S on the side of the driving circuit 1 and the point Q on the side of the receptacle connector 3 (i.e., the length of transmission line 2) are configured on the basis of its relationship with rise time Tr (or the fall time Tf) at the point L of input by a transmitted signal from the driving circuit land represented by the following mathematical expression (2).

$$\text{(Transmission time of line length } Ls) \times 2 < Tr, \text{ and}$$

$$\text{(Transmission time of line length } Ls) \times 2 < Tf \tag{2}$$

In this embodiment, the transmission time is a value obtained by converting the line length into time, and thus it is the time to be required to pass the transmitted signal through the present transmission line.

If the line length Ls takes a value of 0 (zero) or over, then the transmission time that corresponds to Ls satisfies the following mathematical expression (3).

$$0 < \text{(Transmission time of line length } Ls) \tag{3}$$

In this expression, the rise time Tr and the fall time Tf at the point L2 of the expression (2) are defined as follows.

The rise time Tr at the point L is defined by a voltage difference between an overshoot voltage "VL'" and a steady voltage VL after the lapse of the transmission time of round-trip Ls.

At first, an overshoot rate, X[%], is defined as the following equation (4).

$$X = (VL' - VL)/VL \times 100 \, [\%] \tag{4}$$

Figure 2:
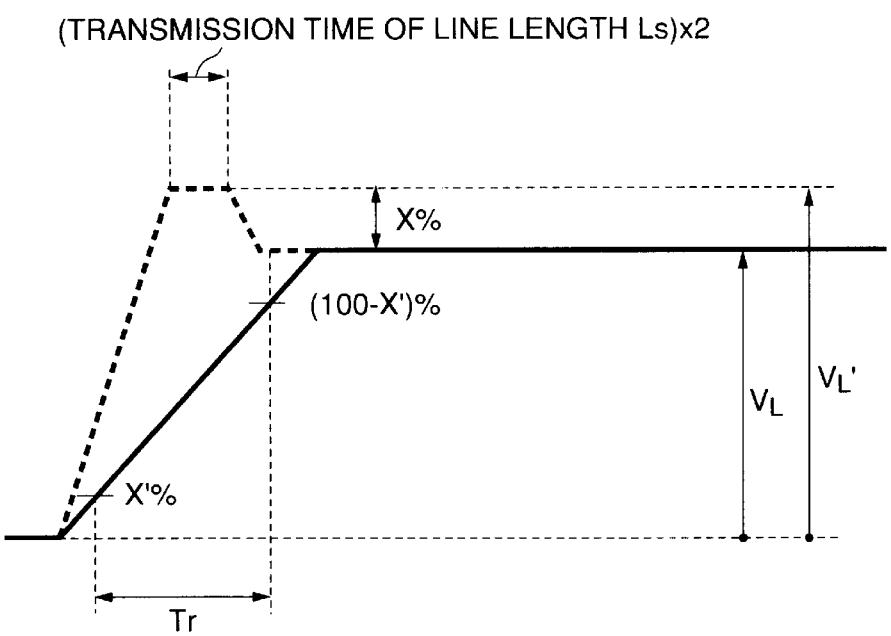
FIG. 2 is graph for explaining a rise time Tr.

Then, the rise time Tr is defined as a time during which a waveform at the point L of the transmission line changes from X'[%] to (100−X')[%]. X' is shown in FIG. 2 and denotes a value that satisfies the following mathematical expression (5).

$$X' < X[\%] \tag{5}$$

Also, the fall time Tf is defined as the same manner.

In this way, both the rise time Tr and the fall time Tf are defined based on the overshoot rate X[%]. This is because a high-speed transmission causes the subsequent change before rising or falling a voltage level, so that there is the need for raising or lowering a voltage level a little earlier when the overshoot rate is high. Such definitions make both the rise time Tr and the fall time Tf shorten. As a result, the transmission time of the second transmission line 2 is set short time.

However, such a definition is required when the frequency of a signal to be transmitted is high. The present invention can be similarly applied even if X' is 10% or 20%, which is a general definition of the rise time and the fall time.

In this embodiment, the boundary between the first transmission line and the second transmission line is positioned on a point between the transmission line 10 and the driver's side receptacle connector 3. Alternatively, the characteristic impedance may be changed at some point of the transmission line formed on the printed board in the package and such a point may be provided as the boundary between the first and second transmission lines.

Next, the operation of the embodiment will be described.

Figure 3:
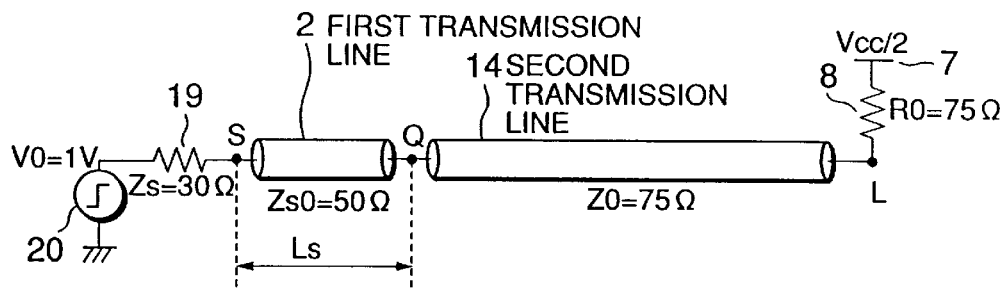
FIG. 3 is a circuit diagram for equivalently illustrating the signal transmission system of the first embodiment.
Figure 4:
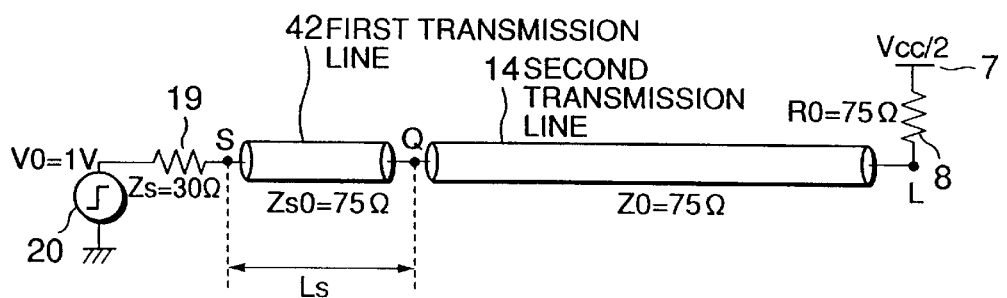
FIG. 4 is a circuit diagram for equivalently illustrating the conventional signal transmission system.

FIG. 3 shows a schematic circuit diagram in which the signal transmission system of the present embodiment is illustrated equivalently. FIG. 4 is a schematic circuit diagram in which the conventional transmission system is illustrated equivalently. Furthermore, FIG. 5 is a diagram that illustrates waveforms of the points S and L, respectively, in the signal transmission system of the present embodiment, while FIG. 6 is a diagram that illustrates waveforms of the points S and L, respectively, in the conventional signal transmission system shown in FIG. 4.

Figure 5:
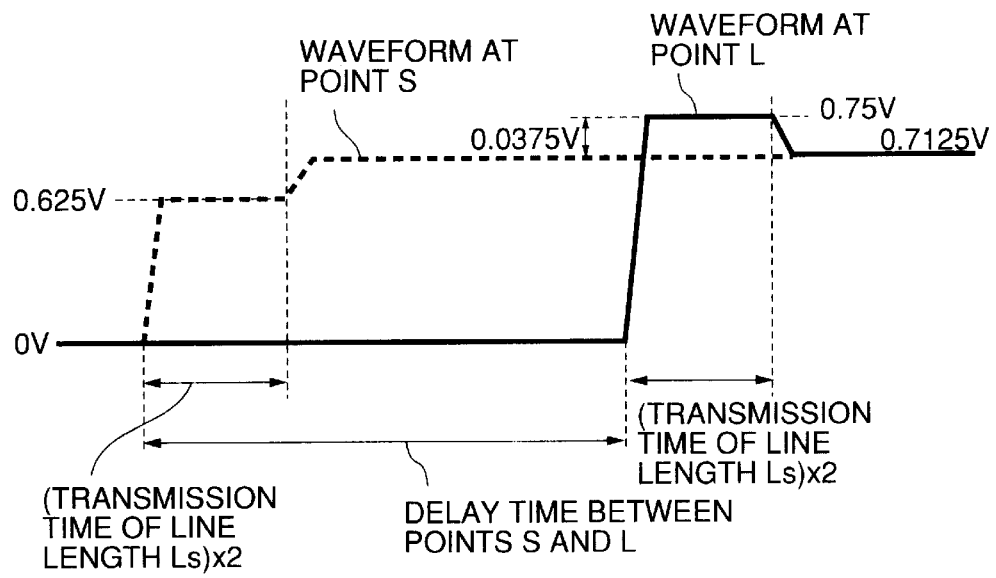
FIG. 5 is a waveform diagram that illustrates waveforms at the points of S and L, respectively, in the signal transmission system of the first embodiment.
Figure 6:
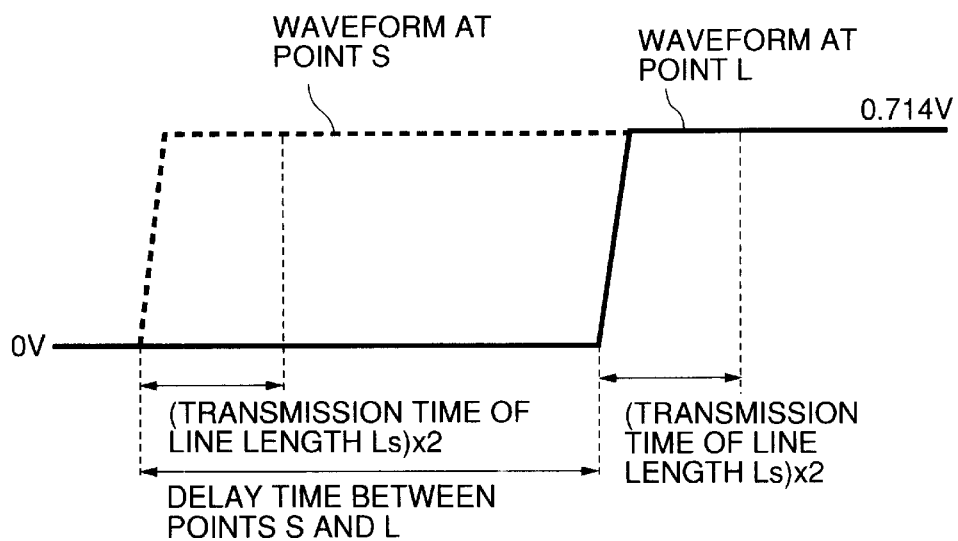
FIG. 6 is a waveform diagram that illustrates waveforms at the points of S and L, respectively, in the conventional signal transmission system shown in FIG. 4.

In FIGS. 5 and 6, the waveform of the point S is indicated by a broken line while the waveform of the point L is indicated by a solid line.

At first, the initial amplitude Vs at the point S in FIG. 3 or FIG. 4 is obtained. That is, the initial amplitude Vs can be defined by the following equation (6).

$$Vs = VO \times ZsO/(Zs + ZsO) \tag{6}$$

The resulting initial amplitude Vs under each of the conditions of FIG. 3 and FIG. 4 is as follows. That is, the conventional signal transmission system attains Vs=0.714 volt while the signal transmission system of the present embodiment attains Vs=0.625 volt.

In the conventional signal transmission system, there is no mismatch point, so that the initial amplitude Vs (Vs=0.714 volt) propagates to the point L substantially without any variation, resulting in the waveforms of the respective points S and L shown in FIG. 6.

In the configuration of the system in accordance with the present embodiment, reflections occur due to an impedance mismatch at the point Q. At the point Q a reflection coefficient of the transmitted signal from the point S to the point L can be evaluated by the equation (7) below.

$$\rho n = (ZO - ZsO)/(ZO + ZsO) \tag{7}$$

wherein ρn denotes a reflection coefficient which is received by the transmitted signal from the point S to the point L at the point Q.

Thus, the initial amplitude Vs, 0.625 volt, is increased by a factor of (1+ρn) at the point Q, so that it becomes the following equation.

$$Vs \times (1 + 0.2) = 0.625 \times 1.2 = 0.75 \text{ volt}$$

That is, the initial amplitude is amplified at the point Q and transmitted as the initial amplitude of 0.75 volt to the point L. In this case, however, the reflection caused by the mismatch at the point Q propagates (i.e., returns) to the point S, so that reflections occur again due to an impedance mismatch at the point S because of the relationship between Zs and ZsO:

$$Zs<ZsO$$

That is, the reflection noise (Vs*ρn=0.625*(+0.2)=0.125 volt) generated at the point Q is negatively reflected (i.e., due to Zs<ZsO) at the point S after a delayed time between the point S and the point Q (using the equation (8) described below 0.25*ρns=0.125*(−0.25)=−0.03125 volt).

$$\rho ns=(ZO-ZsO)/(ZO+ZsO) \quad (8)$$

wherein ρn denotes a reflection coefficient which is received by the transmitted signal from the point Q to the point S at the point S.

Then, it is re-amplified by a factor of (1+ρn) (=1.2 times) at the point Q and thus the reflection of −0.0375 volt, which is produced by multiplying −0.03125 by 1.2, is transmitted to the point L.

Following the transmission of initial amplification (0.75 volt), the amplification is reduced by 0.0375 volt after a round-trip propagation time of the section between the point S and the point Q and converges to a stable level. Consequently, the resulting waveform is shown in FIG. 5, which is different from that of the conventional configuration of the system. As shown in the figure, the waveform at the point L is characterized by having an overshoot.

The overshoot rate is determined by the above equation (4). Practically, however, it can be varied due to the length of transmission line (transmission time) and the amount of attenuation.

As a matter of fact, furthermore, each of the waveforms shown in FIG. 5 and FIG. 6 is the one obtained by the calculation. An actual waveform is different from the calculated one because of attenuation. The measurement waveforms obtained by experiment are shown in FIG. 7 to FIG. 12.

Figure 7:
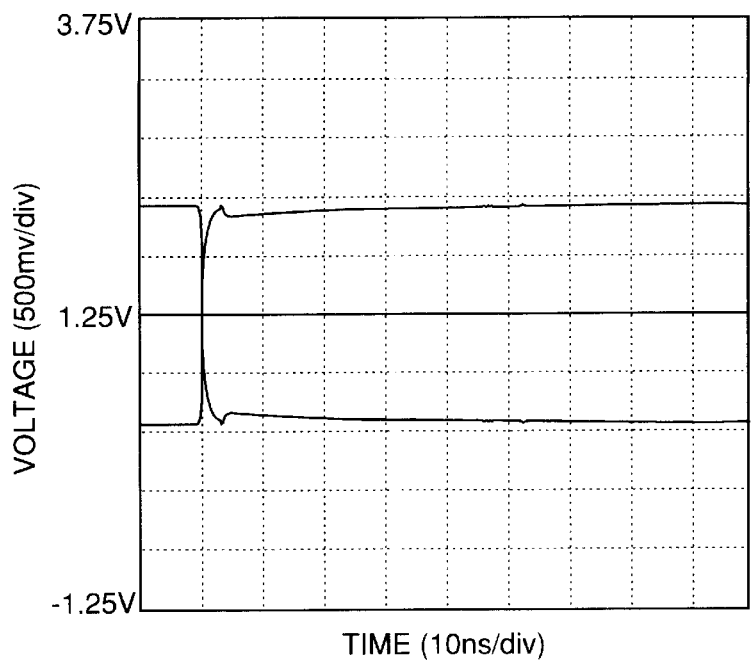
FIG. 7 is a waveform diagram that illustrates a step waveform in the signal transmission system of the first embodiment.
Figure 8:
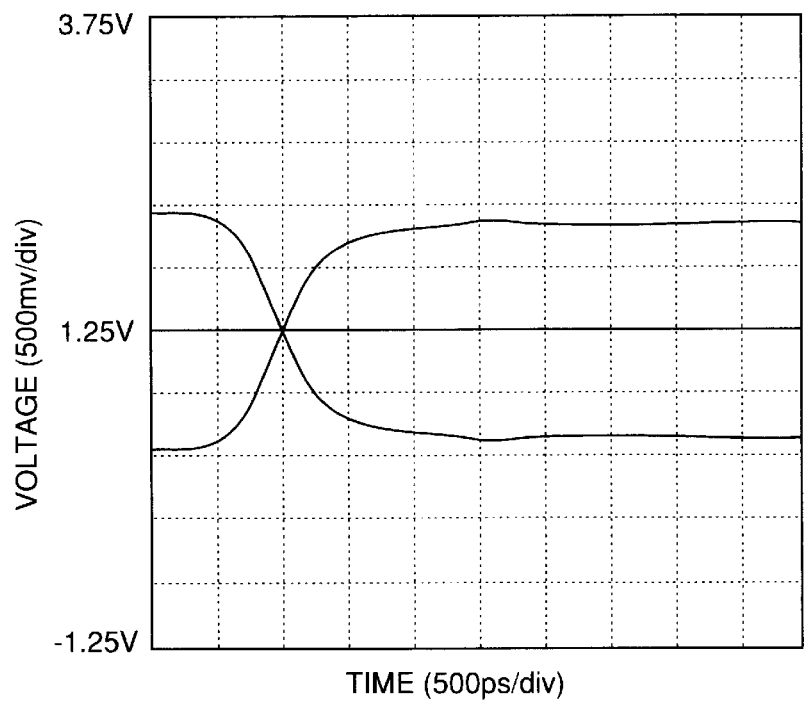
FIG. 8 is an enlarged view of the step waveform shown in FIG. 7.
Figure 9:
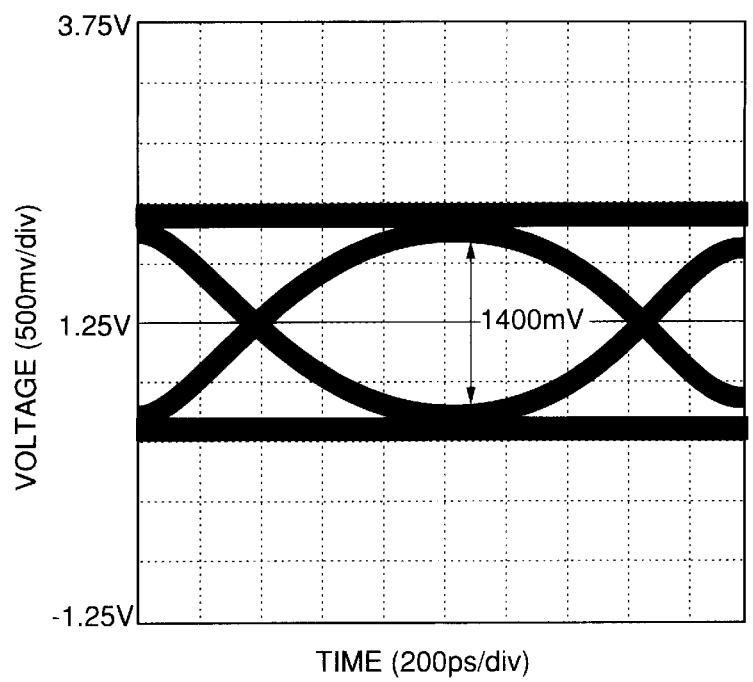
FIG. 9 is a waveform diagram that illustrates overwritten waveforms with eye (window)-shaped curves due to a pseudo-random bit stream (PRBS) in the signal transmission system of the first embodiment.

Waveforms shown in FIGS. 7 to 9 are provided as the results of the process of measuring the waveforms of signal transmission lines of the present embodiment shown in FIGS. 1 to 3, respectively.

In those measurements of waveforms, the transmission line 2 is constructed by a printed-board wiring of 10 centimeters in length (70 ps/cm), the transmission line 4 is constructed by a 5-meter cable (about 4 ns/m), and the transmission line 6 is constructed by a print-board wiring of 10 centimeters in length (70 ps/cm). FIGS. 7 to 9 show the results of measuring waveforms at the point L provided as an input of the receiving circuit due to Complimentary Metal Oxide Semiconductor (CMOS) driving circuit with an electric supply of 2.5 volt under the conditions of an output impedance of the driving circuit: Zs=30Ω, a characteristic impedance of the first transmission line 2: ZsO=50Ω, a characteristic impedance of the second transmission line 14: ZO=75Ω, and RO=75Ω(Vcc=2.5 volt).

Figure 10:
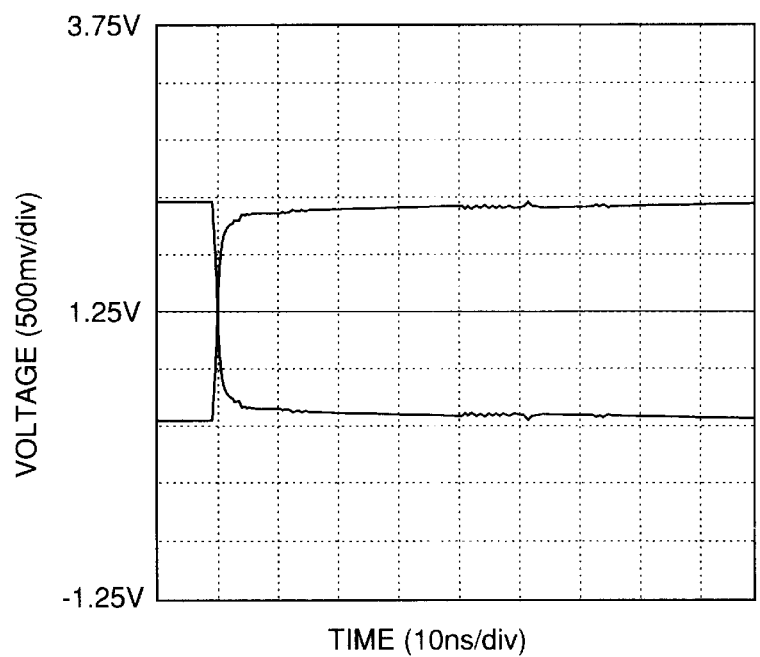
FIG. 10 is a waveform diagram that illustrates a step waveform in the conventional signal transmission system shown in FIG. 4.
Figure 11:
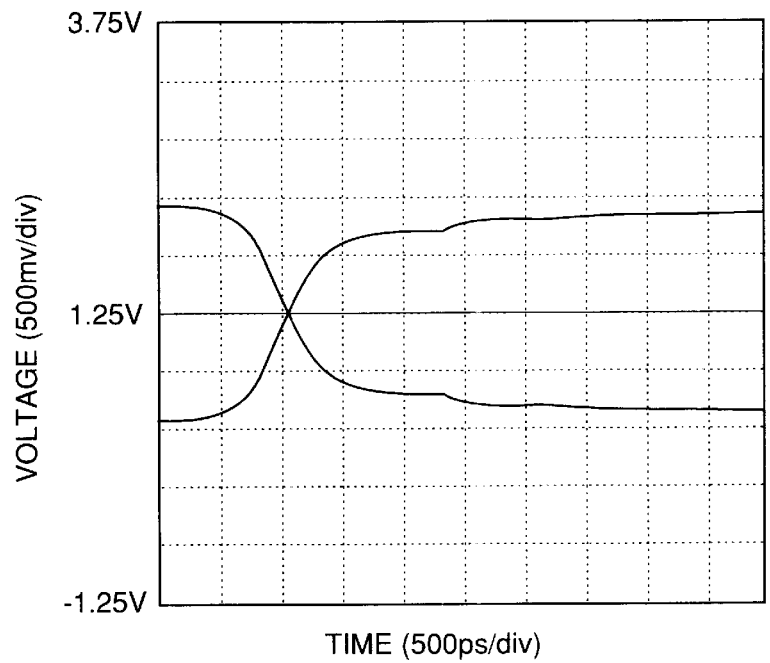
FIG. 11 is an enlarged view of the step waveform shown in FIG. 10.
Figure 12:
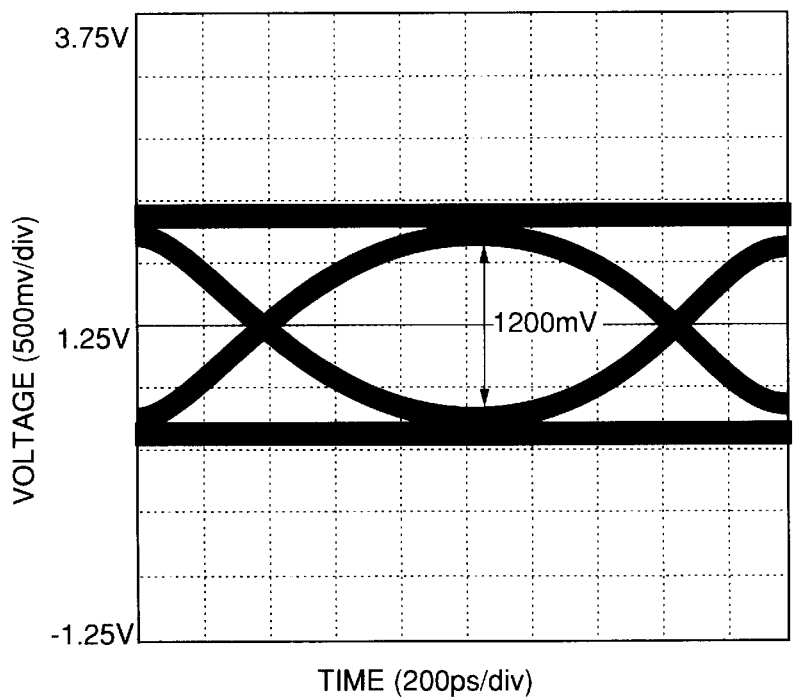
FIG. 12 is a waveform diagram that illustrates overwritten waveforms with eye (window)-shaped curves due to a pseudo-random bit stream (PRBS) in the conventional signal transmission system shown in FIG. 4.

In FIGS. 10 to 12, on the other hand, the results of measuring waveforms in the conventional signal transmission system under the same conditions as those of FIGS. 7 to 9 except that a characteristic impedance ZsO, 50Ω, of the first transmission line 2 is replaced with a characteristic impedance ZsO, 75Ω, of the first transmission line 42.

FIG. 7 shows a waveform diagram that illustrates a step waveform at the point L of the present signal transmission system, while FIG. 9 shows that of the conventional one. FIG. 8 and FIG. 10 are enlarged views of the step waveforms in FIG. 7 and FIG. 9, respectively. FIG. 9 is a waveform diagram that illustrates overwritten waveforms delineated like eyes (windows) by a pseudo-random bit stream (PRBS) (f=400 MHz) in the signal transmission system of the present embodiment, while FIG. 11 is that of the conventional one.

Performing the comparison between FIG. 7 and FIG. 10 (i.e., changing the characteristic impedance Zs from 75Ω to 50Ω), an overshoot appears in the step waveform in FIG. 7. Performing the comparison between FIG. 8 and FIG. 11, attenuation improvement effects can be found in both rising and decreasing portions. Furthermore, a 200 mile-volt rise (improvement) in a voltage margin can be found in FIG. 9 as compared the overwritten eye-shaped waveform diagrams of FIG. 9 and FIG. 12 due to the respective pseudo-random bit streams (PRBSs) of the respective transmission waveforms. These are evaluation results obtained before the optimization, so that further reduction can be accomplished by the evaluation using a transmission simulation or the like.

The signal transmission system of the present embodiment is configured so that the output impedance Zs of the driving circuit 1, the characteristic impedance ZsO of the first transmission line 2, and the characteristic impedance ZO of the second transmission line 14 are adjusted so as to satisfy the mathematical relation (1) described above. Further, the time obtained by doubling a transmission time of the first transmission line is set to be shorter than the rise time Tr and the fall time Tf of the signal at the output end of the second transmission line 14. Such a setting makes the above overshoot property contribute to improve the attenuation at the high frequency. As a result, an waveform at an output terminal of the second transmission line 14 (i.e., an waveform at an input of the receiving circuit 9) becomes the one having the properties of overshooting.

In this way, in the signal transmission system of the present embodiment, because the signal attenuation is improved the decrease in both the transmission distance and the transmission speed, which is caused by the attenuation of transmission line at a high frequency, can be improved. As a result, the transmission distance or speed can be improved and the scale-up of margin can be attained.

Next, a second embodiment of the present invention will be described in detail. A signal transmission system of the present embodiment includes a package 10 having a driving circuit 1, a package 12 having a receiving circuit 2, and a transmission line 4 connected between the passage 1 and the passage 2. Comparing with the first embodiment, the system of the present embodiment is configured without the terminating power supply source 7 and the terminating resistor 8.

Figure 13:
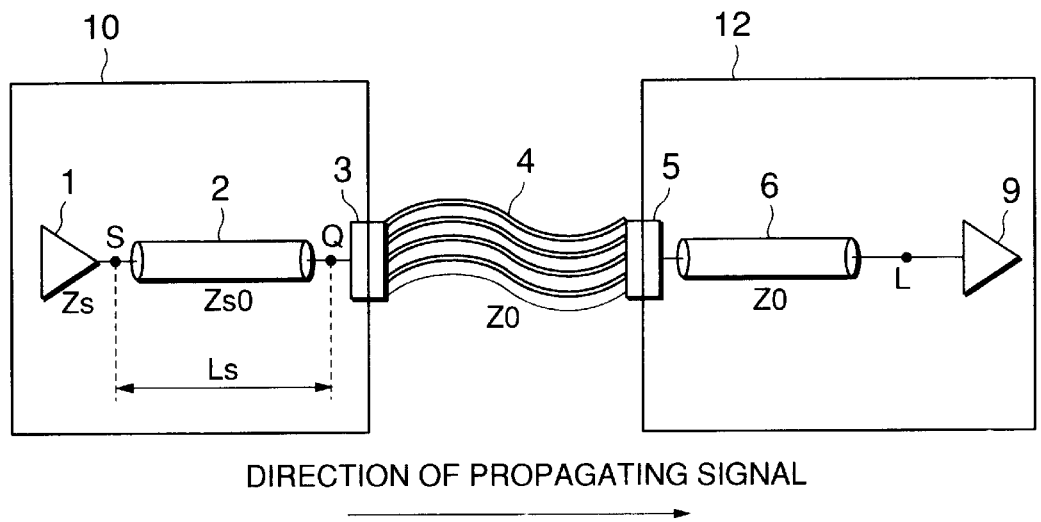
FIG. 13 is a schematic diagram that illustrates a configuration of a signal transmission system as a second embodiment of the present invention.

Referring to FIG. 13, the difference between the signal transmission system of the present embodiment and the signal transmission system of the first embodiment is the presence or absence of the termination. The signal transmission system of the first embodiment has the termination, so that a signal can be transferred at faster than a signal-transfer speed of the present embodiment. However, there is no difference in the effects to be obtained regardless of the presence or absence of the termination. Therefore, the effects to be obtained by the signal transmission system of the present embodiment are similar to those of the first embodiment, so that the detailed description of the present embodiment will be omitted from the following discussion in the interest of simplicity.

Next, a third embodiment of the present invention will be described in detail. The signal transmission system of the present embodiment includes a driving circuit 1, a first transfer line 2, a second transfer line 14, a receiving circuit 9, a terminating voltage supply 7, and a terminating resistor 8, in a single package 28.

Figure 14:
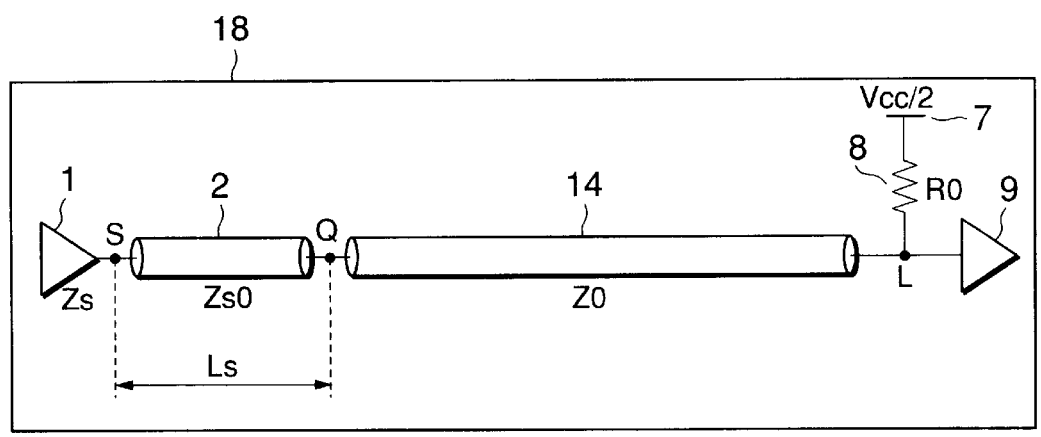
FIG. 14 is a schematic diagram that illustrates a configuration of a signal transmission system as a third embodiment of the present invention.

Referring to FIG. 14, the effects of the signal transmission system of the present embodiment are similar to those of the first embodiment, so that the detailed description of the present embodiment will be omitted from the following discussion in the interest of simplicity.

Next a fourth embodiment of the present invention will be described in detail. In this embodiment, a driving circuit 1, a first transfer line 2, a second transfer line 14, and a receiving circuit 9 are included in one package 28 without having the terminating voltage source 7 and the terminating resistor 8 with compared to the above third embodiment.

Figure 15:
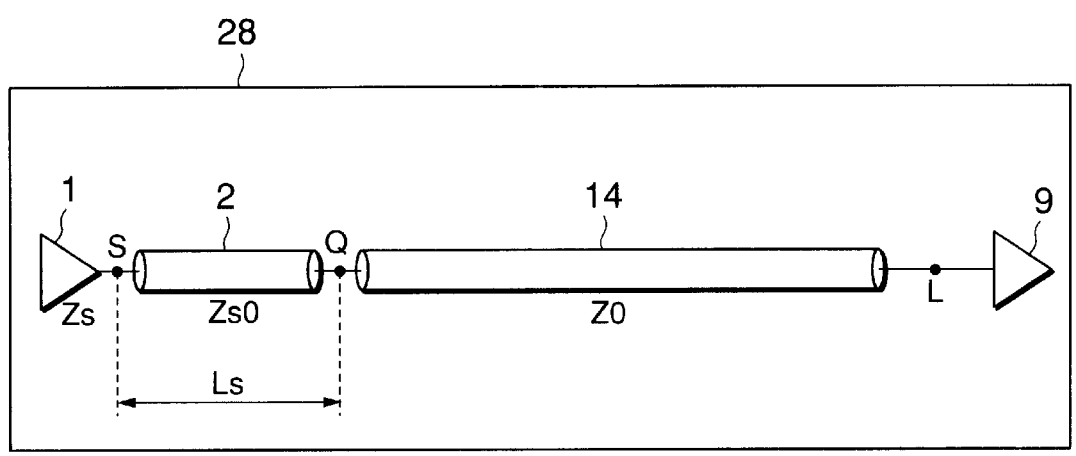
FIG. 15 is a schematic diagram that illustrates a configuration of a signal transmission system as a fourth embodiment of the present invention.

Referring to FIG. 15, the effects of the signal transmission system of the present embodiment are similar to those of the third embodiment, so that the detailed description of the present embodiment will be omitted from the following discussion in the interest of simplicity.

In the first and third embodiments described above, a far-end of the system is terminated by the terminating resistor 8. However, in the present invention, another terminating means may be used instead of such a terminating resistor 8.

As described above, therefore, in the signal transmission system of the present embodiment, improvements can be made to prevent or ease the decrease in both the transmission distance and the transmission speed due to the attenuation of transmission line at a high frequency, so that the transmission distance or speed can be improved as the scale-up of margin can be attained.

While this invention has been described in conjunction with the preferred embodiments described above, it will now be possible for those skilled in the art to put this invention into practice in various other manners.

What is claimed is:

1. A signal transmission system comprising:
    a driving circuit with a characteristic impedance of Zs;
    a receiving circuit for receiving the signal from said driving circuit; and
    a transmission line for transmitting a signal from said driving circuit to said receiving circuit,
    wherein said transmission line includes a first transmission line with a characteristic impedance of ZsO connected to said driving circuit and a second transmission line with a characteristic impedance of ZO connected to said receiving circuit,
    wherein the relationship between said characteristic impedance ZsO and said characteristic impedance ZO is adjusted to satisfy a mathematical relation of: Zs<ZsO<ZO, and
    wherein a time obtained by doubling a transmission time of said first transmission line is shorter than each of a rise time and a fall time of the signal at an output end of said second transmission line.

2. The signal transmission system as claimed in claim 1, wherein said rise time is defined as a time required for rising the signal from 10 to 90 percent at the output end of said second transmission line, and
    wherein said fall time is defined as a time required for falling the signal from 90 to 10 percent at the output end of said second transmission line.

3. A signal transmission system as claimed in claim 1, wherein said rise time is defined as a time required for rising the signal from 20 to 80 percent at the output end of said second transmission line, and
    wherein said fall time is defined as a time required for falling the signal from 80 to 20 percent at the output end of said second transmission line.

4. The signal transmission system as claimed in claim 1, wherein said rise time is defined as a time required for rising the signal from an overshoot rate of X percent to an overshoot rate of (100–X) percent at the output end of said second transmission line, and
    wherein said fall time is defined as a time required for falling the signal from an overshoot rate of (100–X) percent to an overshoot rate of X percent at the output end of said second transmission line.

5. The signal transmission system as claimed in claim 1, further comprising a terminating resistor at the output end of said second transmission line.

6. The signal transmission system as claimed in claims 1, wherein said driving circuit is included in a first package, said receiving circuit is included in a second package, said first transmission line is constructed as a transmission line in said first package, and said second transmission line has a transmission line for connecting between said first package and said second package and a transmission line in said second package.

7. The signal transmission system as claimed in claim 1, wherein said driving circuit and said receiving circuit are included in a single package.

8. A signal transmission system comprising:
    a driving circuit with a characteristic impedance of Zs;
    a receiving circuit for receiving the signal from said driving circuit; and
    a transmission line for transmitting a signal from said driving circuit to said receiving circuit,
    wherein said transmission line includes a first transmission line with a characteristic impedance of ZsO connected to said driving circuit and a second transmission line with a characteristic impedance of ZO connected to said receiving circuit,
    wherein said characteristic impedance Zs, said characteristic impedance ZsO and said characteristic impedance ZO is defined to make the signal input to said receiving circuit overshoot, and
    wherein a time obtained by doubling a transmission time of said first transmission line is shorter than each of a rise time and a fall time of the signal at an output end of said second transmission line.

9. The signal transmission system as claimed in claim 8, wherein said rise time is defined as a time required for rising the signal from 10 to 90 percent at the output end of said second transmission line, and
    wherein said fall time is defined as a time required for falling the signal from 90 to 10 percent at the output end of said second transmission line.

10. A signal transmission system as claimed in claim 8, wherein said rise time is defined as a time required for rising the signal from 20 to 80 percent at the output end of said second transmission line, and
    wherein said fall time is defined as a time required for falling the signal from 80 to 20 percent at the output end of said second transmission line.

11. The signal transmission system as claimed in claim 8, wherein said rise time is defined as a time required for rising the signal from an overshoot rate of X percent to an overshoot rate of (100–X) percent at the output end of said second transmission line, and
    wherein said fall time is defined as a time required for falling the signal from an overshoot rate of (100–X)

percent to an overshoot rate of X percent at the output end of said second transmission line.

12. The signal transmission system as claimed in claim 8, further comprising a terminating resistor at the output end of said second transmission line.

13. The signal transmission system as claimed in claim 8, wherein said driving circuit is included in a first package, said receiving circuit is included in a second package, said first transmission line is constructed as a transmission line in said first package, and said second transmission line has a transmission line for connecting between said first package and said second package and a transmission line in said second package.

14. The signal transmission system as claimed in claim 8, wherein said driving circuit and said receiving circuit are included in a single package.

* * * * *